(12) United States Patent
Norton

(10) Patent No.: US 8,601,667 B2
(45) Date of Patent: Dec. 10, 2013

(54) ROTATING COUPLING FOR ROBOTIC TOOL CHANGER WITH ACTUATION MECHANISM

(75) Inventor: Daniel Allen Norton, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 701 days.

(21) Appl. No.: 12/554,543

(22) Filed: Sep. 4, 2009

(65) Prior Publication Data

US 2009/0322041 A1 Dec. 31, 2009

Related U.S. Application Data

(63) Continuation-in-part of application No. 11/695,212, filed on Apr. 2, 2007.

(60) Provisional application No. 60/789,004, filed on Apr. 4, 2006.

(51) Int. Cl.
*B23B 31/22* (2006.01)

(52) U.S. Cl.
USPC ............... 29/428; 279/71; 279/81; 279/140; 403/322.2

(58) Field of Classification Search
USPC ........ 29/428; 279/2.19, 2.23, 71, 73, 81, 134, 279/140; 403/322.2; 439/348
IPC ....................................................... B23B 31/22
See application file for complete search history.

(56) References Cited

U.S. PATENT DOCUMENTS

| | | | | | |
|---|---|---|---|---|---|
| 1,406,220 | A | * | 2/1922 | Pickett | 279/81 |
| 2,134,199 | A | * | 10/1938 | Newton et al. | 220/86.4 |
| 2,408,689 | A | * | 10/1946 | Seme | 33/573 |
| 2,470,256 | A | * | 5/1949 | McIlroy | 285/277 |
| 3,822,951 | A | * | 7/1974 | Bornzin | 403/316 |
| 4,231,581 | A | * | 11/1980 | Benedict | 279/19.4 |
| 4,652,187 | A | * | 3/1987 | Regelsberger et al. | 408/240 |
| 4,696,524 | A | * | 9/1987 | Cloyd | 439/197 |
| 4,708,548 | A | * | 11/1987 | Taylor et al. | 409/234 |
| 4,775,269 | A | * | 10/1988 | Brix | 408/239 R |
| 5,211,501 | A | * | 5/1993 | Nakamura et al. | 403/322.3 |
| 7,252,453 | B1 | * | 8/2007 | Little | 403/322.2 |
| 2007/0235949 | A1 | * | 10/2007 | Gloden et al. | 279/2.12 |

* cited by examiner

*Primary Examiner* — Eric A Gates
(74) *Attorney, Agent, or Firm* — Coats & Bennett, P.L.L.C.

(57) ABSTRACT

In a robotic tool changer, a rotating cam surface ring having a plurality of surfaces formed therein urges a plurality of ball members in one tool coupling unit radially to contact a coupling surface in the other tool coupling unit. Mechanical energy captured and stored upon decoupling the units is used by an actuation mechanism, upon manual initiation, to at least partially automatically couple the two units by partially rotating the rotating cam surface ring. Further manual rotation of the cam member exerts a radial force through the ball members onto the coupling surface. A component of that force is directed by the coupling surface toward the opposite tool coupling unit, locking the two units together.

22 Claims, 9 Drawing Sheets

ROTATING COUPLING FOR ROBOTIC TOOL CHANGER WITH ACTUATION MECHANISM

This application is a Continuation-In-Part of U.S. patent application Ser. No. 11/695,212, filed Apr. 2, 2007, which claims priority to Provisional U.S. Patent Application 60/789,004 filed Apr. 4, 2006, entitled, "Rotating Coupling for Robotic Tool Changer." Both applications are incorporated herein by reference in their entireties.

FIELD OF INVENTION

The present invention relates generally to the field of robotics and in particular to a rotating coupling for a robotic tool changer having an actuation mechanism operative to partially couple the changer upon initiation.

BACKGROUND

Industrial robots have become an indispensable part of modern manufacturing. Whether transferring semiconductor wafers from one process chamber to another in a cleanroom or cutting and welding steel on the floor of an automobile manufacturing plant, robots perform many manufacturing tasks tirelessly, in hostile environments, and with high precision and repeatability.

In many robotic manufacturing applications, the considerable cost of an industrial robot is amortized over a variety of tasks by providing different tools, or end effectors, that may be coupled to a general-purpose robotic arm. For example, in an automotive manufacturing application, a robot may be utilized to cut, grind, or otherwise shape metal parts during one production run, and perform a variety of spot welding tasks in another. Different welding tool geometries may be advantageously mated to a particular robot to perform welding tasks at different locations or in different orientations. In these applications, a tool changer is used to mate different tools to the robot.

One half of the tool changer, called the master unit, is permanently affixed to a robot arm. The other half, called the tool unit, is affixed to each tool that the robot may utilize. Utilities such as electrical current, air pressure, hydraulic fluid, cooling water, and the like, are fed through cables and plumbing down the robot arm, that terminate at the master unit. Similar cables and plumbing carry the utilities from the tool unit to the particular tool. When the tool changer halves are mated, the utilities are transferred across the changer and made available at the tool. A tool changer thus provides a standard mechanical interface for physically coupling a variety of tools to a robotic arm, as well as providing for the transfer of utilities. Utility and safety concerns dictate that the physical coupling between master and tool units of a robotic tool changer be robust and secure, even in the face of a power outage or loss of a utility such as pneumatic pressure.

While industrial robots tend to be large, highly automated devices, robotic tool changers find utility in other applications. For example, in robot-assisted surgery, a relatively small robot arm positions surgical tools in a pre-defined "safe zone." Surgeons then operate using the tools, while the robot prevents the tools from moving outside of the pre-defined safe zone of operation. In such applications, due to size, weight, cost, and among other constraints to properly clean and sterilize the tool, it may be advantageous for tools to be attached, and for a robotic tool changer to be actuated (that is, or moved between coupled and decoupled states) manually.

The use of ball members, urged by a piston against an inclined surface, to lock the master and tool units together is known in the art. For example, U.S. Pat. No. 4,696,524 (incorporated herein by reference) discloses a plurality of ball members contained within the master unit, and circumferentially arranged around a central axis. Extending from the master unit, along this axis, is a piston member having an inclined surface operative to contact the ball members and urge them outwardly as the piston advances axially. The ball members contact a surface in the tool unit disposed at an angle such that outward force induced on the ball members by the piston generates an "upward" force component that presses the angled surface, and thus the entire tool unit, against the master unit.

U.S. Pat. No. 5,211,501 (incorporated herein by reference) discloses a similar piston and ball member arrangement, with an improved piston/ball member contact surface. This patent discloses a multifaceted contact surface comprising an initial tapered contact surface for first contacting the ball members and moving them outward and into contact with an angled surface of the tool unit. A flat—i.e., parallel with the piston axis—failsafe surface is adjacent the initial tapered surface. A tapered locking surface, at an angle with respect to the axis of less than that of the initial actuating surface, is adjacent the failsafe surface.

For the following discussion, assume the master unit is oriented over the tool unit, with the interface plane between the two modules parallel with the horizon. As the piston member advances axially (downwardly) into the tool unit, the initial contact surface contacts the ball members and moves them radially outward (horizontally) into the tool unit. At the extent of the piston's axial movement, the final tapered surface presses each ball member outwardly against an angled surface in the tool unit. This angled surface tapers inwardly, toward the piston axis, as it approaches the master unit. Each ball member, urged outwardly by the tapered locking surface of the piston member, presses against the tool unit angled surface with a resultant force that can be decomposed into horizontal (outward) and vertical (upward) components. The vertical component of force presses the tool unit upward and locks the tool unit to the master unit.

The ball members press inwardly against the piston with equal and opposite force. Since the tapered locking surface is angled with respect to the piston axis, the force exerted by each ball member is a resultant force that can also be decomposed into horizontal (inward) and vertical (upward) components. In the event of a loss of force actuating the piston, the vertical component of force exerted by the ball members urges the piston upwardly. As the piston moves upwardly, the balls are free to move inwardly, pressing with less force on the tool unit angled surface and tending to decouple the master and tool units. For safety, a failsafe surface is interposed between the piston initial contact surface and the tapered locking surface, both of which are tapered. The failsafe surface is vertical—i.e., parallel with the piston axis. During a power loss, force exerted by the ball members may move the piston slightly upwards, until the ball members contact the failsafe surface. Since the failsafe surface is vertical, the resultant force exerted by the ball members is normal, i.e., horizontal, and includes no vertical component. This prevents force from the balls on the piston from further retracting the piston into the master unit and further decoupling the modules, without some positive actuation of the piston in that direction. Accordingly, the tool unit remains coupled to the master unit when piston actuating power is lost.

U.S. Pat. No. 7,252,453 (incorporated herein by reference) discloses a similar piston and ball member arrangement, with a piston member contact surface having a tapered locking surface at an angle with respect to the axis greater than that of the initial actuating surface.

Pending patent application Ser. No. 11/374,706 (incorporated herein by reference) discloses a similar piston and ball member arrangement, with a piston member contact surface having a failsafe surface that includes a lip, or protrusion, which actively opposes retracting motion of the piston. When the master and tool units are coupled together—that is, when the ball members are fully extended by the tapered locking surface and pressing against the tool unit angled surface—the protrusion on the failsafe surface is past (below) the ball members. In the event of loss of piston actuating power, the force exerted by the ball members on the tapered locking surface tends to decouple the master and tool units, as described above. This tendency is neutralized by the failsafe surface being parallel to the piston axis, thus not supporting any component of force in the axial direction. The protrusion provides an additional assurance that the piston cannot retract into the master unit. Moving the protrusion past the ball members requires a positive retracting force on the piston, since the balls must momentarily be pressed yet further against the tool unit angled surface for the protrusion to pass. The protrusion may comprise a raised surface, or the lip of a depression in the failsafe surface into which the ball members nestle.

Pending provisional patent application Ser. No. 60/789,004 (incorporated herein by reference), discloses a variety of similar piston and ball member arrangements, wherein the piston is actuated between retracted and extended positions by electrical power and various power transmission systems and gear trains.

In all of the above examples, the ball members are moved outwardly against the tool unit's angled surface by axial motion of a piston. This requires sufficient room in the master tool unit above the piston to house the piston in the retracted position. If the ball members could be actuated outwardly and forced against the tool unit angled surface without requiring axial motion of a piston, the master tool unit may be designed with a more compact, lower profile shape.

SUMMARY

According to one or more embodiments disclosed and claimed herein, a rotating cam surface ring having a plurality of surfaces formed therein urges a plurality of ball members in one tool coupling unit radially to contact a coupling surface in the other tool coupling unit. Mechanical energy captured and stored upon decoupling the units is used by an actuation mechanism, upon manual initiation, to at least partially automatically couple the two units by partially rotating the rotating cam surface ring. Further manual rotation of the cam member exerts a radial force through the ball members onto the coupling surface. A component of that force is directed by the coupling surface toward the opposite tool coupling unit, locking the two units together.

One embodiment relates to a robotic tool changer. The tool changer includes a first unit operative to be attached to one of a robot and a robotic tool, and a second unit operative to be attached to the other of the robot and a robotic tool, the second unit further operative to be selectively coupled to and decoupled from the first unit. The tool changer also includes a plurality of ball members disposed in the first unit, and a rotating cam surface ring disposed in one of the units and operative to engage the ball members in the first unit and to urge the ball members, by rotational movement of the rotating cam surface ring, against a coupling surface of the second unit to lock the first and second units together. The tool changer further includes an actuation mechanism operative to automatically at least partially rotate the rotating cam surface ring upon manual initiation, so as to at least partially urge the ball members against the coupling surface.

DETAILED DESCRIPTION

Figure 1:
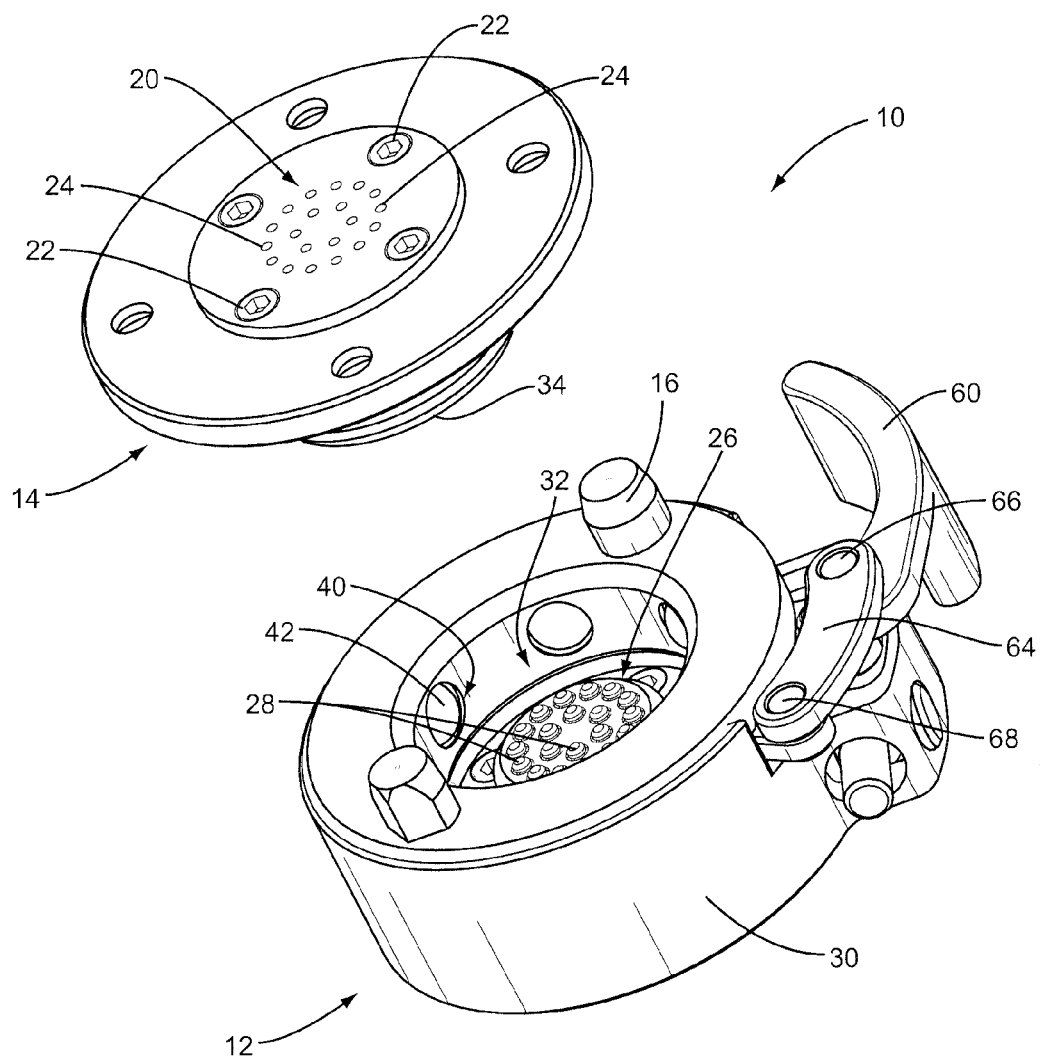
FIG. 1 is a perspective rendering of a manual handle-actuated robotic tool changer having a rotating coupling mechanism.

In the following discussion, reference is made to the drawing figures, in which the same parts and components are numbered consistently. In describing the movement or actuation of various components, directional terms such as up, left, clockwise, and the like, are used for clarity of explanation. These directional terms should be understood to apply only to a depiction in a particular drawing figure, clearly referenced in the description. In practice, of course, a robotic tool changer may assume any orientation, and directional terms used herein are not in any sense a limitation on the scope of the claimed invention.

According to one or more embodiments of the present invention, a rotating coupling mechanism couples the master and tool units of a robotic tool changer together, obviating the need for a piston that moves axially to achieve the coupling.

FIG. 1 depicts a robotic tool changer, indicated generally by the numeral 10. The robotic tool changer 10 comprises a master unit 12 adapted to be connected to a robotic arm (not shown) and a tool unit 14, adapted to be connected to a robotic tool (not shown). The robotic tool changer 10 allows users to selectively attach different tools to a robotic arm by selectively coupling and decoupling the master unit 12 to different tool units 14. Alignment pins 16 on the master unit 12 mate with corresponding alignment holes (not shown) on the tool unit 14, to ensure proper alignment of the master and tool units 12, 14 when the units are coupled together.

In various embodiments, the tool changer 10 may provide for the passing of various utilities, such as electrical power, pneumatic gas, fluids, data signals, and the like, between a robotic arm and a robotic tool. FIG. 1 depicts a removable central tool core module 20 connected to the tool unit 14, such as via fasteners 22. A plurality of holes 24 extend through the tool core module 20. Similarly, a removable central master core module 26 is connected to the master unit 12. The master core module 26 includes a plurality of electrical connectors 28, each of which mates, when the master unit 12 and tool unit 14 are coupled, with corresponding electrical connectors (not shown) on the tool core module 20. Wires carrying the electrical signals may extend through the holes 24 in the tool core module 20, for connection to circuits on a robotic tool (not shown). Both the master core module 26 and tool core module 20 are removable, and may be replaced in other embodiments by core modules providing for the transfer of pneumatic gas, fluids, electrical power, or the like. Additionally, in various embodiments, utility modules (not shown) may be attached to the sides of the master unit 12 and tool unit 14, which couple together and provide for the passing of utilities when the tool changer units 12, 14 are coupled together, as known in the art.

Figure 2:
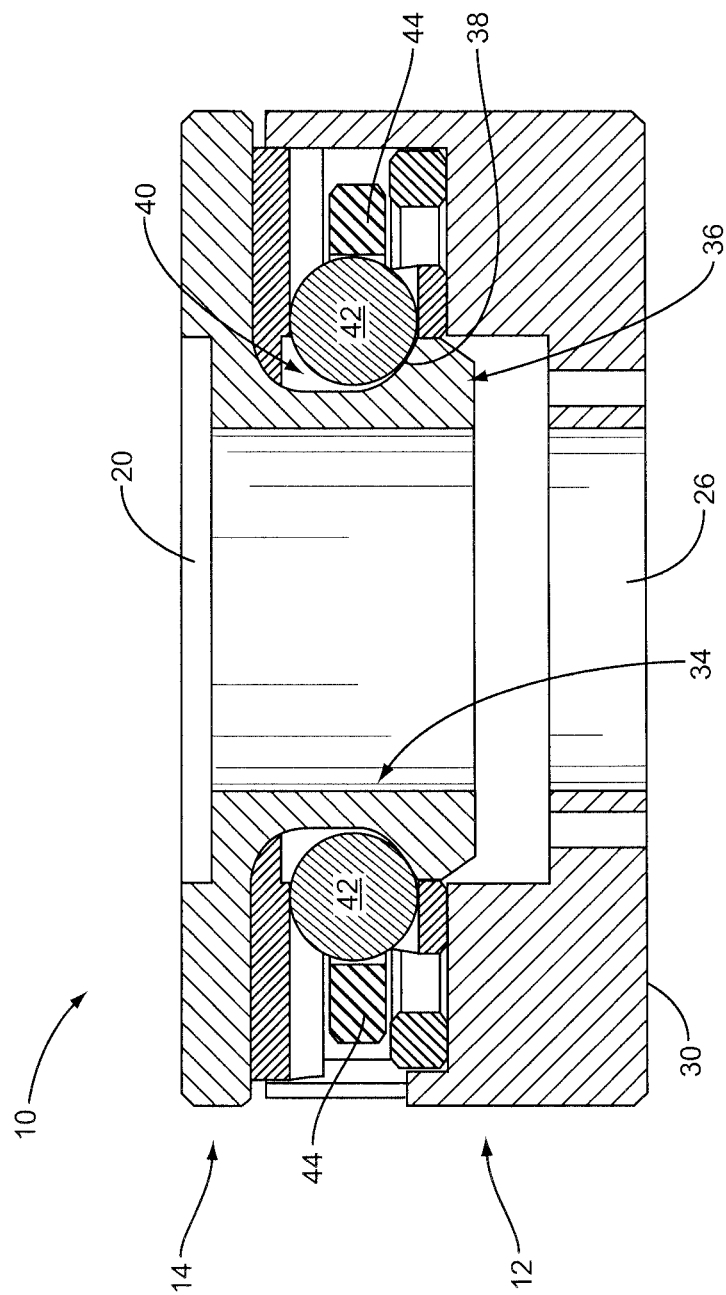
FIG. 2 is a vertical sectional view of the tool changer of FIG. 1.

The master unit 12 includes a housing 30 having a circular chamber 32 formed therein. The tool unit 14 includes an annular collar 34, within which is disposed the tool core module 20. As depicted in the sectional view of FIG. 2, depicting the master unit 12 and tool unit 14 coupled together, the collar 34 and tool core module 20 extend into the chamber 32 when the master and tool units 12, 14 are abutting. The annular collar 34 includes a lip or protrusion 36 at its distal end, defining a coupling surface 38 on the tool unit 14 side of the collar protrusion 36. The coupling surface 38 may, in various embodiments, be conical (i.e., flat, angled) surface or a curved surface, but in any event, is characterized by an increasing radius of the protrusion 36 in the axial direction of the collar 34 towards the master unit 12.

Referring again to FIG. 1, a plurality of holes 40 is formed in housing 30 around the chamber 32, the holes 40 having generally even radial spacing around the circumference of the chamber 32. In one embodiment, the holes 40 are tapered, having a slightly smaller diameter at the surface of the chamber 32 than deeper within the housing 30. Disposed in each hole 40 is a ball member 42. The ball members 42 are retained within the housing 30 by each tapered hole 40 having a diameter at the surface of the chamber 32 that is slightly less than the diameter of the corresponding ball member 42. Accordingly, the ball members 42 may move between a retracted (decoupled) position wherein the surface of each ball member 42 is at most flush with the surface of the chamber 32, and an extended (coupled) position wherein each ball member 42 extends past the annular surface of the housing 30 and into the chamber 32 by an amount slightly less than the radius of the ball member 42.

Figure 3:
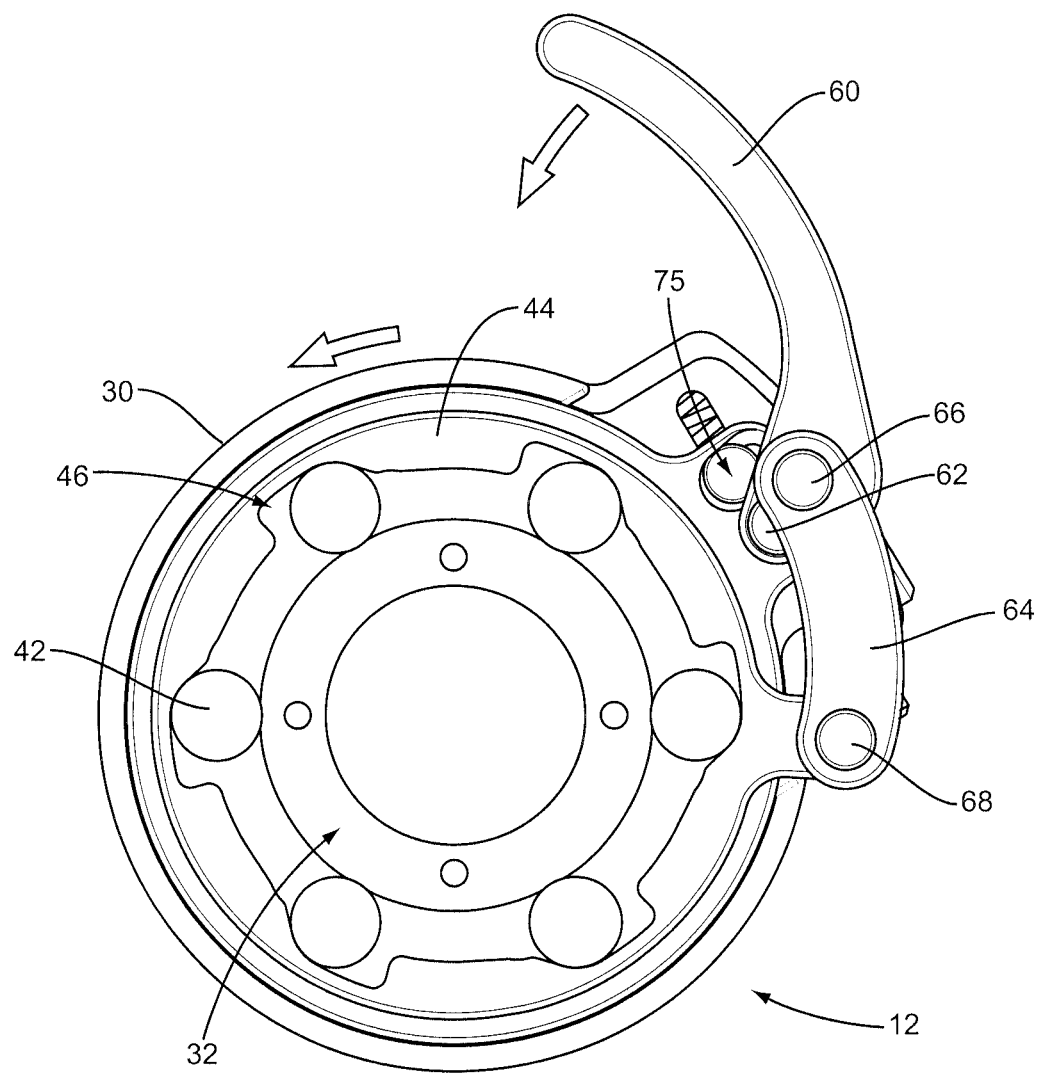
FIG. 3 is a horizontal sectional view of the master unit of the tool changer of FIG. 1 in a decoupled position.
Figure 4:
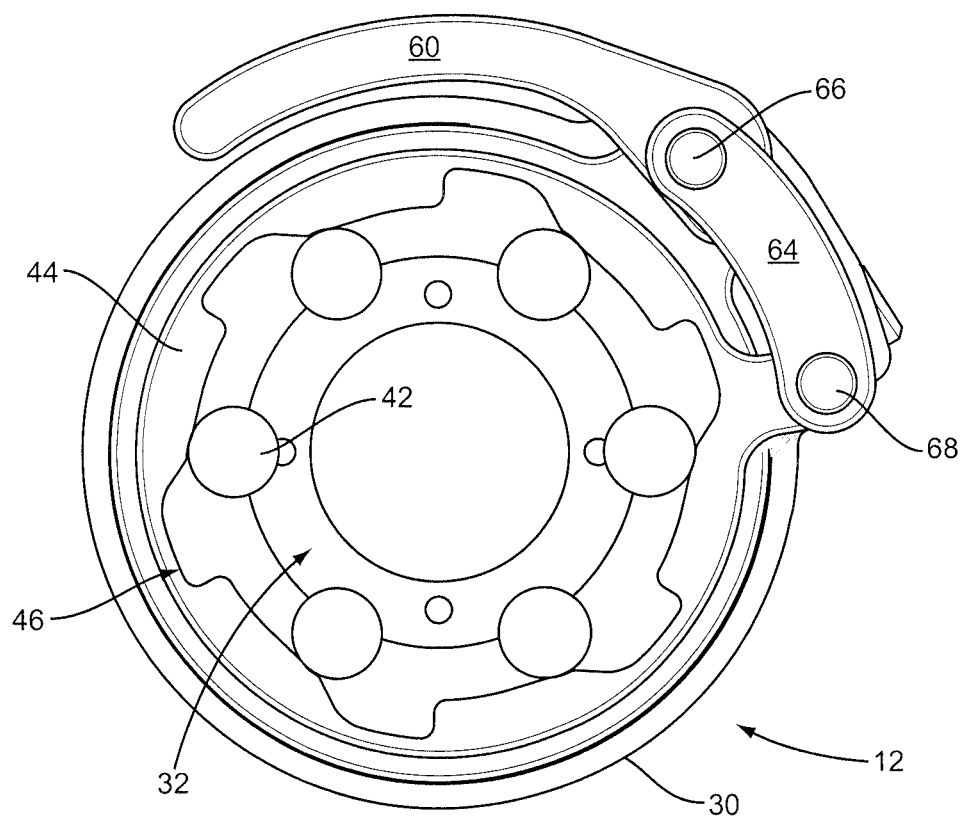
FIG. 4 is a horizontal sectional view of the master unit of FIG. 3 in a coupled position.

A rotating cam surface ring 44, depicted in FIGS. 3 and 4, is disposed within the annular portion of the housing 30 that defines the central chamber 32. The rotating cam surface ring 44 includes a plurality of recesses 46, with the number of recesses 46 corresponding to the number of ball members 42. Each recess 46 comprises a plurality of cam surfaces that actuate a ball member 42 between retracted and extended positions as the rotating cam surface ring 44 rotates about the axis of the chamber 32. As depicted in FIGS. 5-8, and described more fully herein below, each recess 46 includes a nesting surface 48, an actuating surface 50, a failsafe surface 54, and a locking surface 56 (not indicated in FIGS. 3 and 4).

FIGS. 3 and 4 depict the action of the rotating cam surface ring 44 on the ball members 42. FIG. 3 depicts the ball members 42 in a fully retracted (decoupled) position, in which they are retracted within their respective holes 40. In this position, the ball members 42 are just flush with, or are slightly retracted from, the central chamber 32, allowing the annular collar 34 of a tool unit 14 to freely move into the chamber 32. Also in this position, each ball member 42 rests against the nesting surface 48 of the rotating cam surface ring 44. As the handle 60 is actuated in the direction indicated, the rotating cam surface ring 44 rotates in the direction indicated, moving the ball members 42 from retracted to extended positions. FIG. 4 depicts the ball members 42 in a fully extended (coupled) position, in which they extend into the chamber 32 to engage a tool unit 14. In this position, each ball member 42 is pressed inwardly by the locking surface 56.

A handle 60 is pivotally attached to the housing 30 at a first pivot pin 62. The handle is also pivotally attached to a handle linkage member 64 by a second pivot pin 66. The handle linkage member 64 is attached to the rotating cam surface ring 44 by a third pivot pin 68. As the handle 60 is manually moved closer to the housing 30, as indicated by the directional arrow in FIG. 3, the handle linkage member 64 is moved in a counter-clockwise direction, which in turn actuates the rotating cam surface ring 44 counter-clockwise, as indicated by the directional arrow. The position of the second pivot pin 66 relative to the first pivot pin 62 provides an "over center" mechanical advantage, multiplying the rotational force applied to the rotating cam surface ring 44 as the handle 60 is closed.

As the rotating cam surface ring 44 rotates, each ball member 42 is engaged successively by distinct surfaces 48-56 of the corresponding recess 46 (described below). Engagement with these surfaces 48-56 force the ball members 42 to an extended position in which they protrude at least partially into the central chamber 32, engaging the coupling surface 38 of the annular collar 34 of a tool unit 14, when it is positioned within the chamber 32.

FIG. 4 depicts the master unit 12 in a coupled state, with the ball members 42 in an extended (coupled) position, forced into the chamber 32 by actuation of the rotating cam surface ring 44. In one embodiment, the rotating cam surface ring 44 rotates through approximately 10° in moving from the decoupled position of FIG. 3 to the coupled position of FIG. 4.

Figure 5:
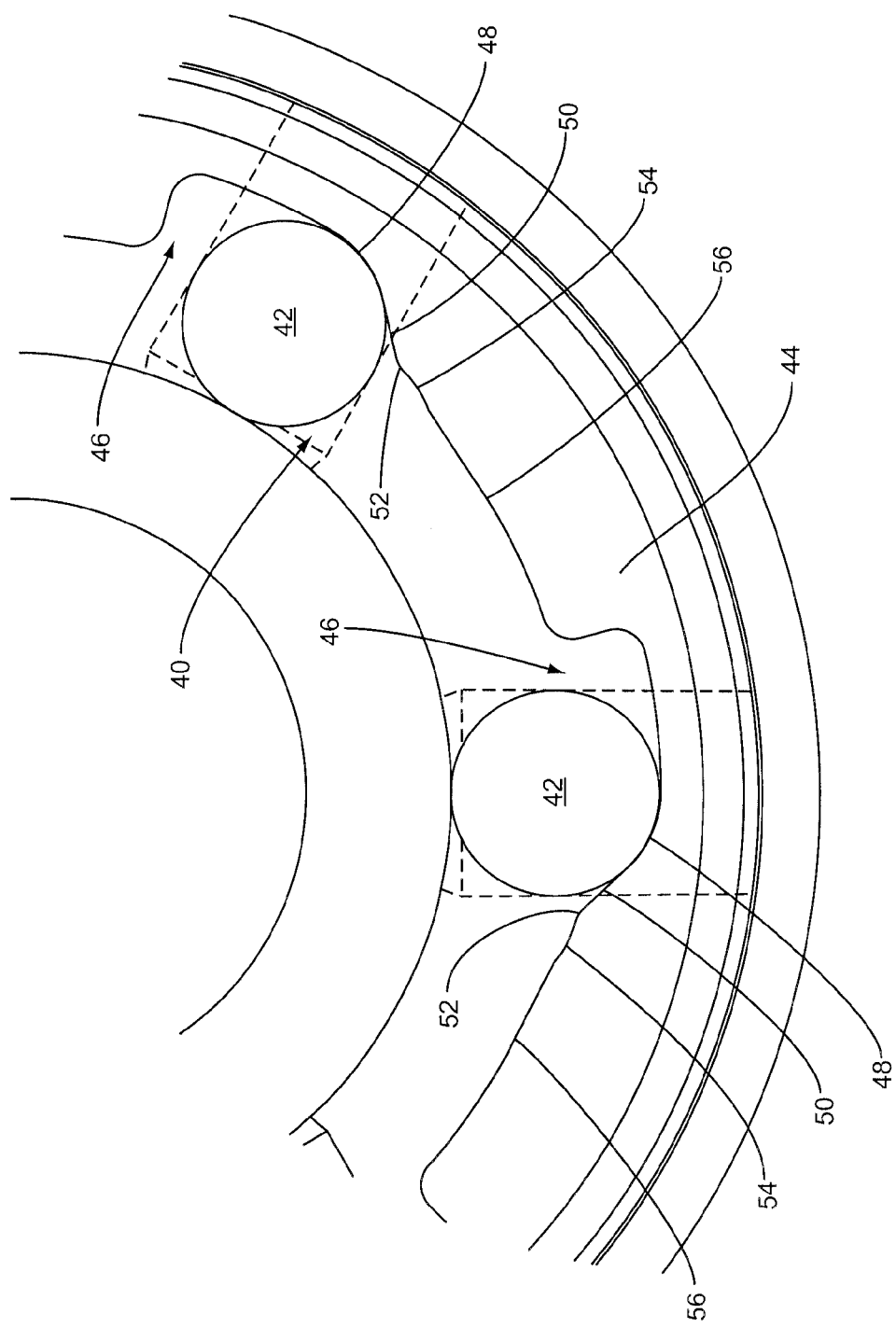
FIG. 5 is an enlarged sectional view of a rotating cam surface ring and ball members in an extended position.

FIG. 5 depicts a partial sectional view showing two ball members 42, each in a fully retracted (decoupled) position, with no portion of a ball member 42 surface protruding past the inner surface of the chamber 32. The dotted lines depict the holes 40 within which each ball member 42 resides. In this position, each ball member 42 contacts the nesting surface 48 of a corresponding recess 46 in the rotating cam surface ring 44. The rotating cam surface ring 44 is in the uncoupled position, in which the master and tool units 12, 14, may be separated.

As the rotating cam surface ring 44 rotates in a counter-clockwise direction, each actuating surface 50 displaces the corresponding ball member 42 inwardly towards the center of the chamber 32. Assuming that a tool unit 12 is abutting the master unit 14, with the annular collar 34 disposed within the chamber 32, as the ball members 42 move inwardly, each will come into contact with the coupling surface 38 of the collar 34 on the tool unit 14, as best seen in FIG. 2. As the cam surfaces 48-56 of each recess 46 press the corresponding ball member 42 inwardly, the resultant force exerted on the coupling surface 38 may be decomposed into two vector components: a force directed inwardly in the direction of the movement of the ball member 42, and a force directed downwardly, in the direction of the master unit 12. This second force locks the tool unit 14 to the master unit 12.

Figure 6:
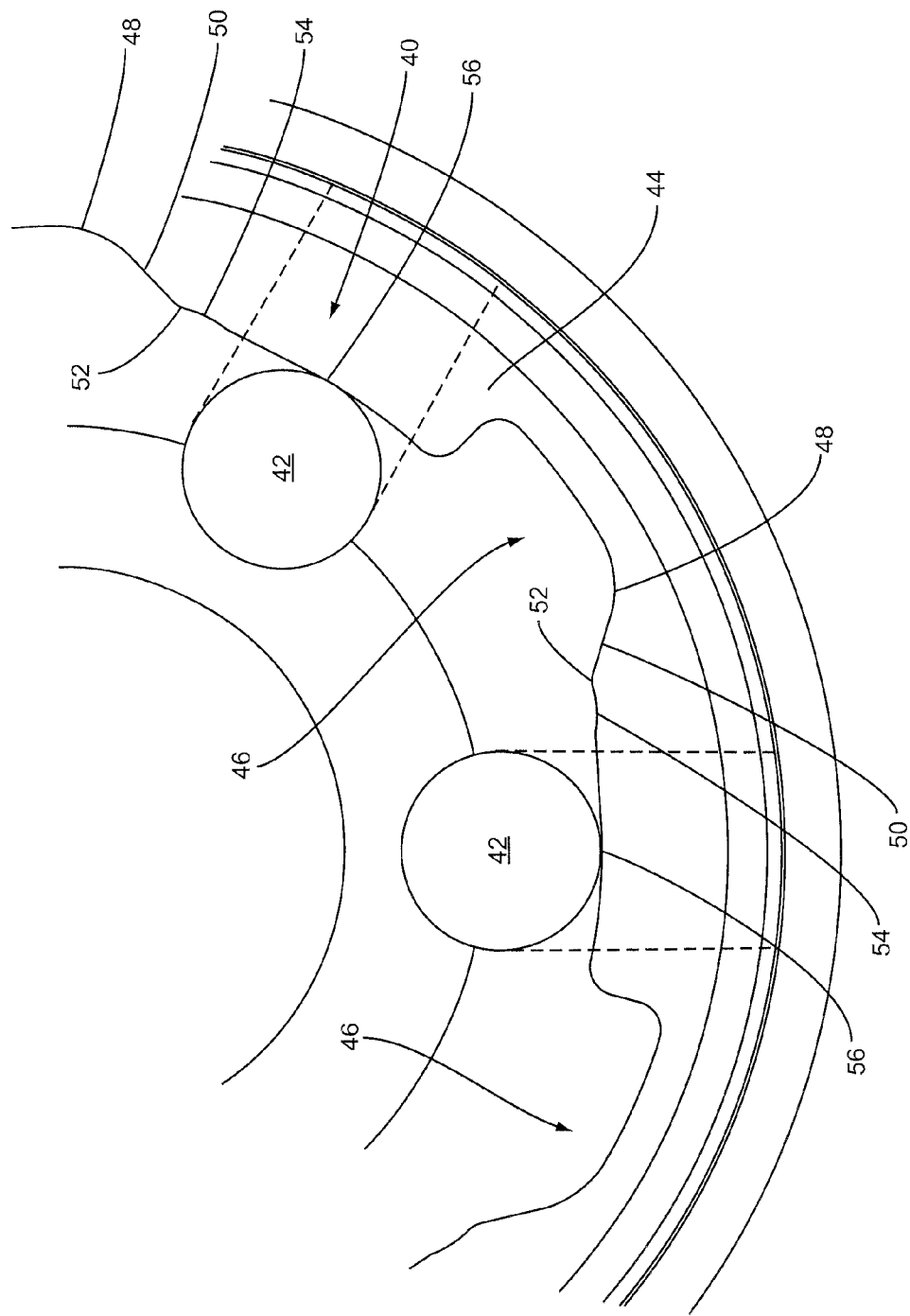
FIG. 6 is an enlarged sectional view of the rotating cam surface ring and ball members in a retracted position.

The rotating cam surface ring 44 continues its rotation in a counter-clockwise direction until each locking surface 56 contacts a corresponding ball member 42, as depicted in FIG. 6. The locking surface 56 presses the ball member 42 tightly against the coupling surface 38 of the tool unit 14 (see FIG. 2). Note that the locking surface 56 extends furthest inward of any surface 48-56 of the recess 46, thus pressing the ball member 42 against the coupling surface 38 with the maximum force. The rotating cam surface ring 44 assumes and maintains the position depicted in FIG. 6 when the master and tool units 12, 14 are coupled together and the handle 60 is moved to the fully closed, or coupled, position.

Safety is always a major concern in robotics. If the handle 60 were to be released from its fully closed position, or in other embodiments in which the rotating cam surface ring 44 is actuated by, e.g., pneumatic pressure, which were to fail, the force of the ball member 42 pressing on the locking surface 56 may urge the rotating cam surface ring 44 in a clockwise direction, releasing pressure exerted through the ball members 42 onto the coupling surface 38 of the tool unit 14. If the rotating cam surface ring 44 were to rotate in this direction to the position depicted in FIG. 3, the ball members 42 may completely disengage the coupling surface 38, allowing the tool unit 14 to decouple from the master unit 12, with potentially disastrous results.

Figure 7:
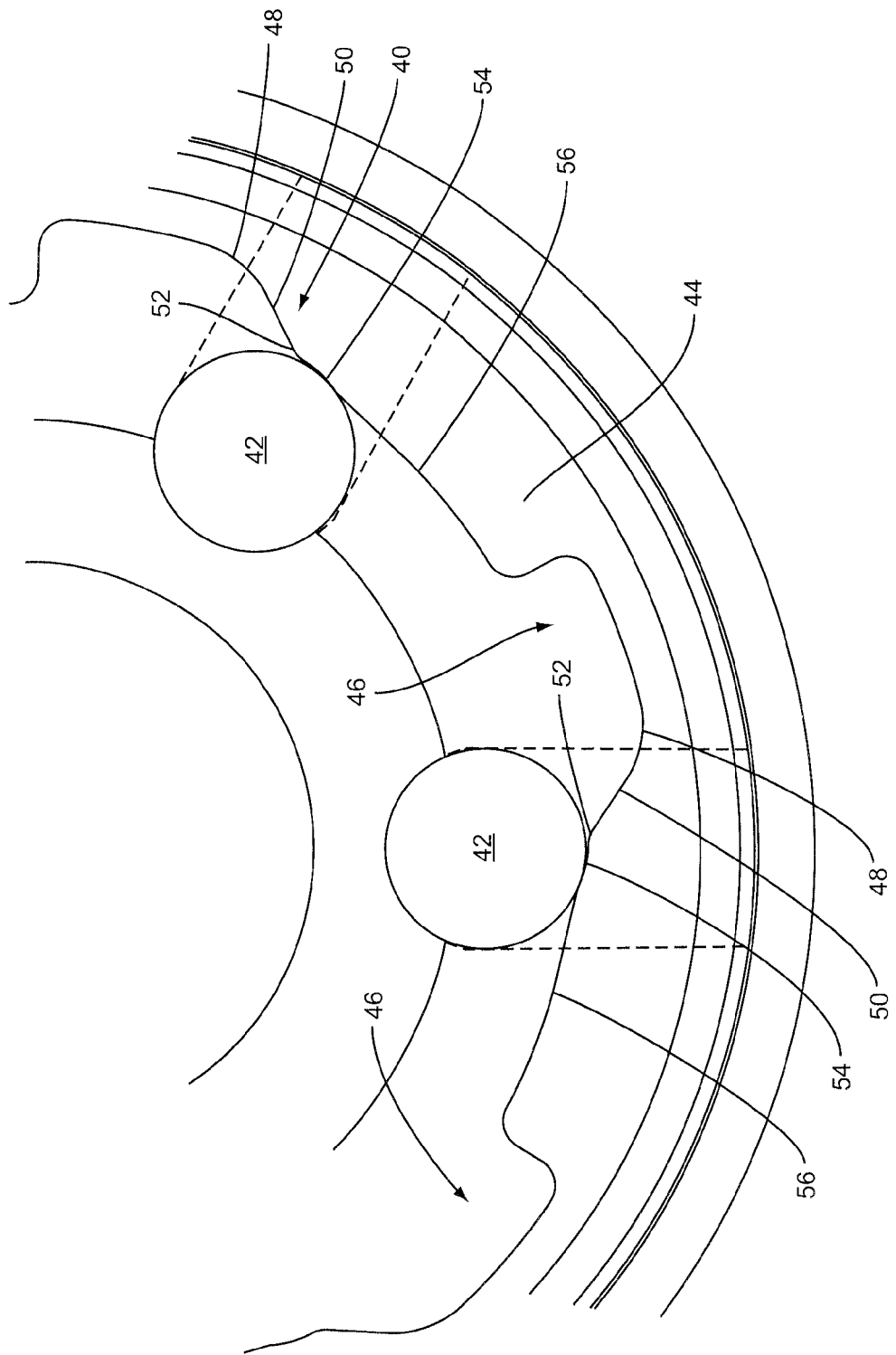
FIG. 7 is an enlarged sectional view of the rotating cam surface ring and ball members in a failsafe position.

To prevent this possibility, each recess 46 of the rotating cam surface ring 44 includes a failsafe surface 54 and optionally a failsafe lobe 52. FIG. 7 depicts a master unit 12 having experienced a loss of actuating power or mechanical lock, and wherein the ball members 42 have urged the rotating cam surface ring 44 slightly in a clockwise direction. As best seen in FIG. 5, the failsafe surface 54 includes a slight recess or ball retention chamber, formed by intersecting slopes from the failsafe lobe 52 and the locking surface 56. This recess tends to cradle the ball member 42. In this position (FIG. 5), the ball member 42 presses outwardly against the rotating cam surface ring 44; however, this force does not induce any torque on the rotating cam surface ring 44 since it presses equally on the failsafe lobe 52 and the locking surface 56 slopes. This prevents the rotating cam surface ring 44 from further clockwise rotation, maintaining a safe, coupled state between the master and tool units 12, 14.

In one embodiment (not shown), the failsafe surface 54 may simply comprise a flat surface, tangential to the axis of the chamber 32, interposed between the actuating surface 48 and the locking surface 56. The resultant force exerted on the ball members 42 by the coupling surface 38 is may be decomposed into vector components directed outwardly and toward the tool unit 14 (i.e., upwardly, as depicted in FIG. 2). Only the outwardly directed component of this force is exerted by the ball members 42 on the rotating cam surface ring 44. Accordingly, the ball member 42 does not exert any component of force in a "side," or circumferential direction that can induce a torque on, or rotation of, the rotating cam surface ring 44 in a clockwise, or unlocking, direction. Hence a tangentially flat failsafe surface 54, normal to the force exerted by the ball member 42, is sufficient to ensure that the ball members 42 cannot urge the rotating cam surface ring 44 to a decoupled position (FIG. 3) in the event of a power loss or mechanical failure of the handle 60.

However, many parasitic forces are present in robotic environments, including vibration, inertial forces induced by movement of the robotic arm, and the like. To provide an even more effective failsafe design that can withstand the effect of such parasitic forces, the embodiment of the rotating cam surface ring 44 depicted in FIGS. 5-8 includes a failsafe lobe 52 that not only disallows the ball members 42 to urge the rotating cam surface ring 44 to a decoupled position (FIG. 3), but further requires the active application of a non-trivial amount of torque to the rotating cam surface ring 44 to pass the failsafe lobe 52 and reach the decoupled position.

Figure 8:
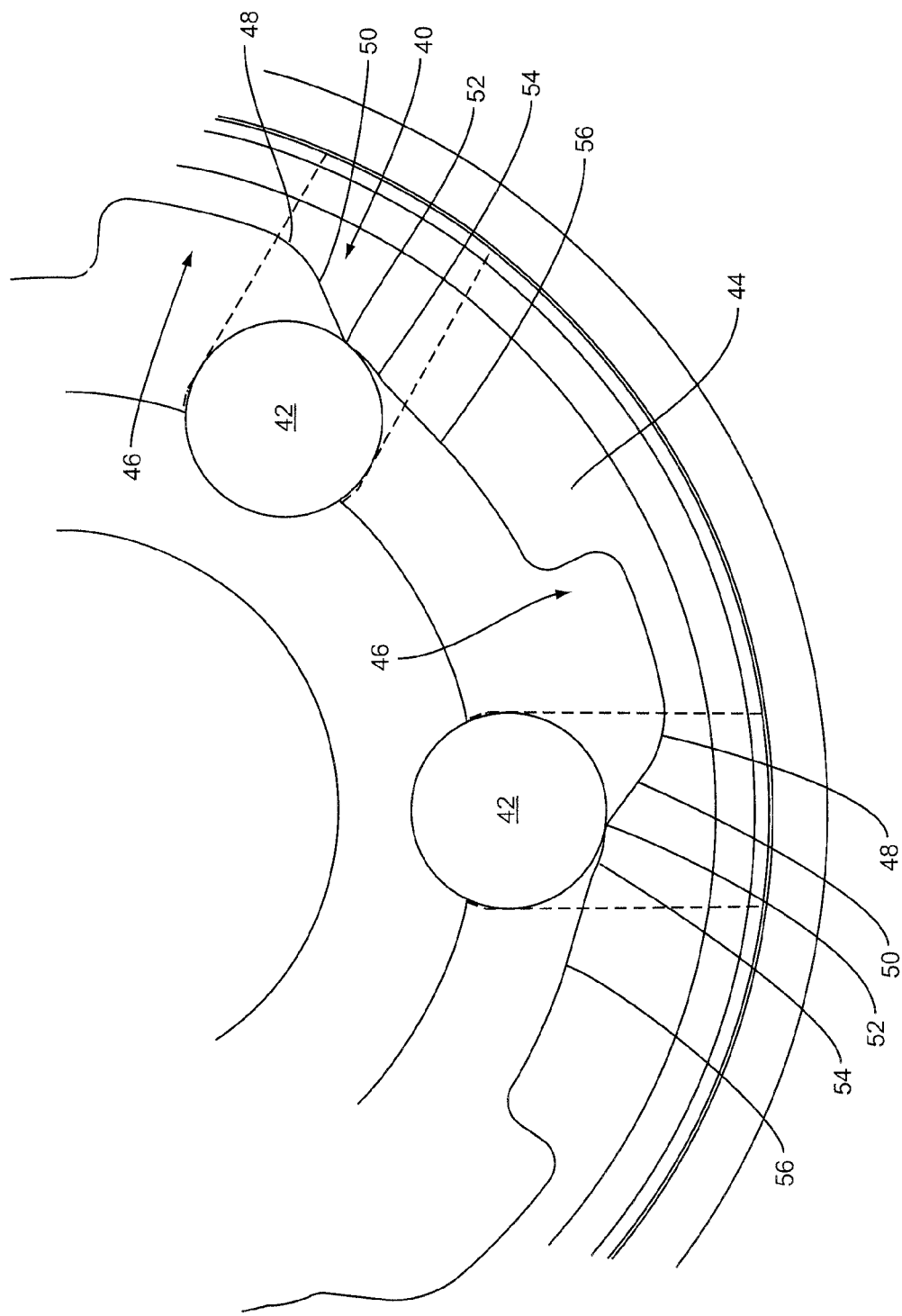
FIG. 8 is an enlarged sectional view of the rotating cam surface ring and ball members crossing a failsafe lobe.

As best seen in FIG. 8, in moving from the coupled to decoupled position, the ball members 42 are allowed to recess slightly as the point of contact moves from the locking surface 56 to the failsafe surface 54. The ball members 42 must then be forced back out into a more extended position to clear the failsafe lobe 52, as depicted in FIG. 8. The torque required to rotate the rotating cam surface ring 44 from the position depicted in FIG. 7 to that depicted in FIG. 8 exceeds any force that may be induced on the rotating cam surface ring 44 by parasitic forces.

In one embodiment, to accommodate for mechanical wear and tool to tool geometric variations, an actuating mechanism 70 automatically partially actuates the master unit 12, upon manual initiation, by rotating the rotating cam surface ring 44 through most of the distance between the decoupled (retracted) position of FIG. 3 to the coupled (extended) position of FIG. 4, using a bias force captured when the master unit 12 is placed in the decoupled position, and stored in the master unit 12. This ensures that the master unit 12 will always move to the optimal lock position when coupled with tool 14.

Figure 9:
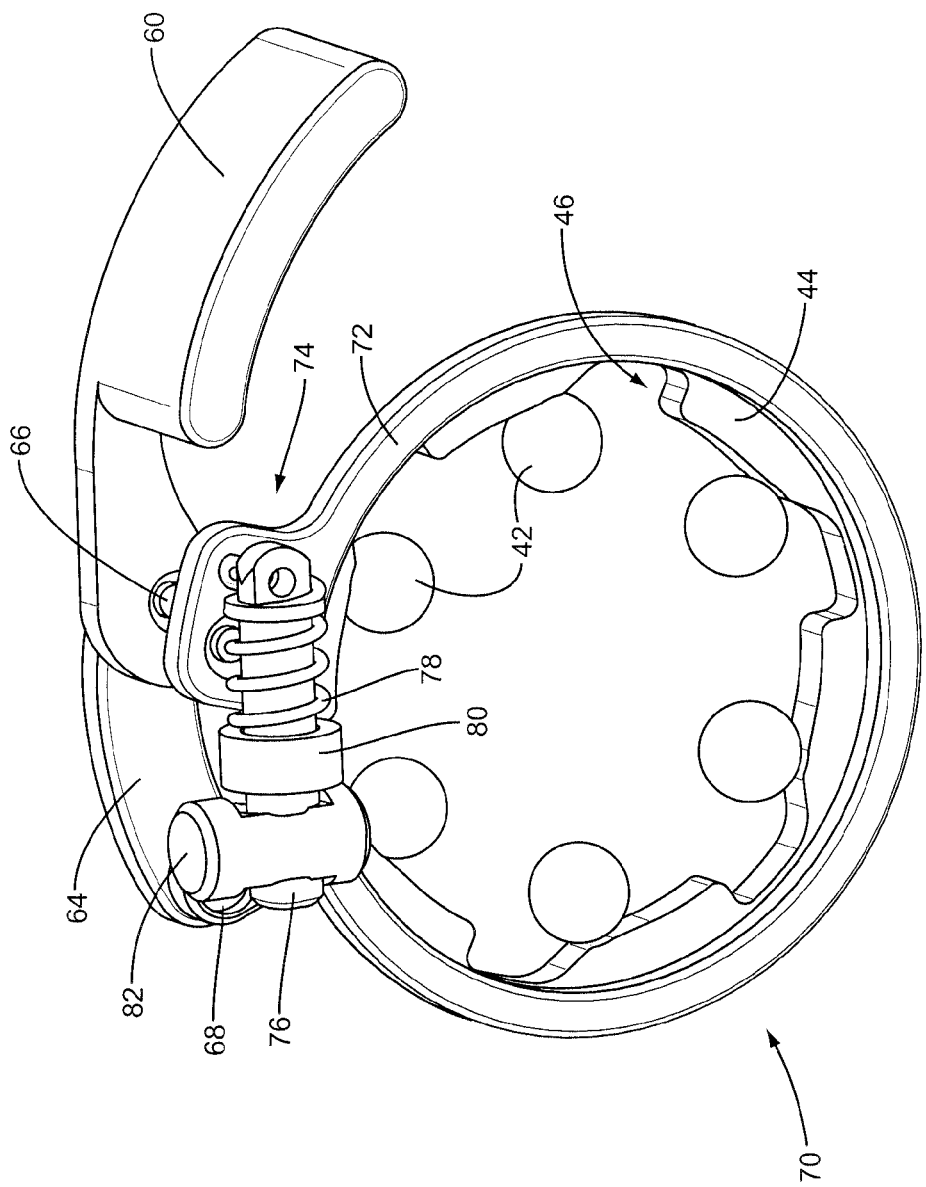
FIG. 9 is a partial exploded perspective view of an actuating mechanism, with the rotating cam surface ring and ball members in a partially coupled position.

FIG. 9 depicts the actuating mechanism 70 and its relation to the rotating cam surface ring 44 and handle 60. Note that the depiction in FIG. 9 is from "below" the actuating mechanism 70; accordingly, the direction of rotation of the rotating cam surface ring 44 is opposite that described elsewhere herein, with reference to other drawing figures.

The actuating mechanism 70 comprises an actuating ring 72 and an actuating driver assembly 74. The actuating ring 72 is rigidly affixed to the rotating cam surface ring 44, such as by pins, fasteners, adhesive, welding, or the like. The actuating driver assembly 74 is affixed to the master unit housing 30. The actuating ring 72 is attached to the actuating driver assembly 74 by a pin-in-slot arrangement 75, as best seen in FIG. 3. This mechanical coupling between the actuating ring 72 and the actuating driver assembly 74 accommodates the radial component of relative motion between the ring 72 and the assembly 74 as the ring 72 rotates between the coupled and decoupled positions.

The actuating mechanism 70 (FIG. 9) comprises, in the embodiment depicted, a rod 76, a spring 78, a bushing 80, and a selectively engaging push button 82. The rod 76 is supported by the bushing 80, which is rigidly affixed to the housing 30. The rod 76 is attached to the actuating ring 72 by the pin-in-slot coupling 75 discussed above. The coupling 76 operates such that as the rod 76 moves linearly to the right within the bushing 80, the actuating ring 72, and hence the rotating cam surface ring 44, rotates toward the coupled position (i.e., clockwise). The spring 78, affixed to the rod 76 at one end and acting against the bushing 80 at the other end, biases the rod 76 to the right, and hence also biases the rotating cam surface ring 44 towards the coupled position. The spring 78 is compressed as the master unit 12 is manually placed in the decoupled state by moving the handle 60 up and to the left. The selectively engaging push button 82 is biased to an engaged position—in the "up" direction—by a spring (not shown) or other mechanical biasing means acting beneath the push button 82.

To maintain the master unit 12 in the decoupled position, the selectively engaging push button 82 engages the rod 76 and holds it in a position to the left of that depicted in FIG. 9, with the spring 78 compressed against the bushing 80. When the desired tool unit 14 is positioned adjacent the master unit 12, with the annular collar 34 disposed within the circular chamber 32, the master unit 12 is automatically placed in a nearly coupled state (that depicted in FIG. 9) by manually depressing the push button 82. This releases the engagement of the push button 82 with the rod 76, allowing the rod 76 to move to the right under the bias of the spring 78 acting against the bushing 80, and rotating the actuating ring 72, and hence the rotating cam surface ring 44, towards the coupled state. This action also moves the handle 60 to a nearly-closed position, as depicted in FIG. 9. The tool changer 10 is then locked into a fully coupled state by manually moving the handle 60 through the remaining small range of motion, to reach the fully coupled position of the rotating cam surface ring 44, as depicted in FIG. 4.

The selectively engaging push button 82 may engage the rod 76 in a variety of ways. In one embodiment, a ratcheting mechanism comprises one or more ribs in the lower interior surface of a hole in the push button 82 through which the rod extends, and a plurality of saw-tooth shaped ribs on at least the lower portion of the rod 76. The saw-tooth ribs comprise an angular surface to the left, and a vertical surface to the right. As the master unit 12 is decoupled by opening the handle 60, the rod 76 slides through the push button 82 via ratcheting engagement of the saw-tooth ribs with the ribs interior to the hole of the push button 82. However, the rod 76 is prevented from motion to the right by engagement with the vertical sides of the saw-tooth ribs. Only upon manually pushing the button 82 downwardly are the ribs disengaged, allowing the rod 76 to move to the right under the bias of the spring 78, placing the master unit 12 in a nearly coupled state.

In another embodiment, at least part of the rod 76 is threaded, and at least the lower side of the hole through the push button 82 is tapped. In this embodiment, from the decoupled position, the push button 82 is pressed downwardly to disengage the threads, allowing the rod 76 to move to the right under the bias of the spring 78 and partially couple the master unit 12 to a tool unit 14. However, to decouple the units 12, 14, the push button 82 must also be pressed downwardly before the handle 60 may be moved from the coupled position to the decoupled position. This provides an additional safety interlock, requiring positive actuation of the push button 82 to decouple the tool changer 10.

Embodiments of the tool changer 10 described herein offer several unique and valuable features. Due to the rotating cam arrangement, as opposed to a piston-actuated cam surface, the tool changer 10 is very compact and lightweight, and may be particularly suited for fabrication in a small form factor. A chamber 32 design on the master unit 12, engaging with an annular collar 34 on the tool unit 14, leaves the center of the tool changer 10 free for the modular provision of whatever utility-passing couplings may be desired or required for particular applications. The automatic actuation feature makes operation of the tool changer 10 simple and quick, and in at least one embodiment provides an additional safety interlock. The failsafe surface 54 and failsafe lobe 52 provide additional passive safety features.

As used herein, the terms "extended" and "retracted" refer to the positions of the ball members 42 with the holes 40 in the master unit housing 30. The extended position corresponds to the "coupled" position of the rotating cam surface ring 44, the handle 60, and/or the tool changer 10 generally. Similarly, the retracted position of the ball members 42 corresponds to the "decoupled" position of the rotating cam surface ring 44, the handle 60, and/or the tool changer 10 generally.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention.

For example, the ball members 42 and/or rotating cam surface ring 44 may be disposed in the tool unit 14, and the coupling surface 38 may be disposed in the master unit 12. Furthermore, the rotating cam surface ring 44 may urge the ball members 42 outwardly rather than inwardly. Although depicted as a spring 78, the bias operating the actuating mechanism 70 may comprise compressed air, or any other mechanism operative to capture and store energy upon decoupling the tool changer 10, and to use the stored energy to drive the actuating mechanism 70 upon coupling the tool changer 10.

In general, a wide variety of variations may be devised by those of skill in the art, given the teachings of the present disclosure. The present embodiments are therefore to be construed in all aspects as illustrative and not restrictive and all changes coming within the meaning and equivalency range of the appended claims are intended to be embraced therein.

What is claimed is:

1. A robotic tool changer, comprising:
   a first unit operative to be attached to one of a robot and a robotic tool;
   a second unit operative to be attached to the other of the robot and a robotic tool, and further operative to be selectively coupled to and decoupled from the first unit;
   a plurality of ball members disposed in the first unit; and
   a rotating cam surface ring disposed in one of the units and rotatable through a predetermined extent, and operative to engage the ball members in the first unit and to urge the ball members, by rotational movement of the rotating cam surface ring, against a coupling surface of the second unit to lock the first and second units together; and
   an actuation mechanism operative to store mechanical energy, and to automatically rotate the rotating cam surface ring partially, but not fully, through its extend upon manual release of the stored mechanical energy, so as to partially, but not fully, urge the ball members against the coupling surface.

2. The tool changer of claim 1 wherein the rotating cam surface ring comprises a plurality of recesses, each recesses associated with a ball member, and each recesses comprising a plurality of surfaces.

3. The tool changer of claim 2 wherein the plurality of surfaces includes a nesting surface operative to contact a ball member in a fully retracted position wherein the ball member does not contact the second unit.

4. The tool changer of claim 3 wherein the plurality of surfaces includes an actuating surface operative to displace a ball member towards contact with the coupling surface of the second unit as the rotating cam surface ring rotates.

5. The tool changer of claim 4 wherein the plurality of surfaces includes a locking surface operative to press a ball member against the coupling surface of the second unit, locking the first and second units together, in a fully extended position.

6. The tool changer of claim 5 wherein the plurality of surfaces includes a failsafe surface interposed between the locking surface and the actuating surface, the failsafe surface contacting a ball member at a normal angle to the direction of motion of the ball member as it moves between retracted and extended positions.

7. The tool changer of claim 5 wherein the plurality of surfaces includes a failsafe lobe interposed between the locking surface and the actuating surface, the failsafe lobe forming a ball member retention channel operative to retain the ball member between the locking surface and the failsafe lobe in the absence of rotational force applied to the rotating cam surface ring.

8. The tool changer of claim 1 wherein the rotating cam surface ring and the ball members are disposed in the first unit.

9. The tool changer of claim 8 wherein the ball members are disposed in a plurality of holes in a housing of the first unit, around a circular chamber formed in the first unit, and wherein rotating the rotating cam surface ring moves the ball members from retracted positions within the holes to extended positions wherein the ball members are disposed partially extended into the chamber.

10. The tool changer of claim 1 wherein the unit housing the rotating cam surface ring further comprises a handle operative to drive the rotating cam surface ring under manual actuation.

11. The tool changer of claim 10 wherein the handle drives the rotating cam surface ring via a handle linkage member interposed between the handle and the cam member.

12. The tool changer of claim 1 wherein the actuation mechanism comprises:
   an actuating ring affixed to the rotating cam surface ring; and
   an actuating driver assembly operative to capture and store mechanical energy upon decoupling the first and second units, and to use the stored mechanical energy to partially, but not fully, rotate the actuating ring upon manual release of the stored mechanical energy by initiating the actuation mechanism.

13. The tool changer of claim 12 wherein the actuating driver assembly comprises:
   a bushing connected to a housing of the unit including the rotating cam surface ring;
   a rod slideably disposed in the bushing and pivotally connected to the actuating ring;
   a spring disposed over the rod, connected to the rod at one end and abutting the bushing at the other end, the spring operative to bias the rod to an extended position in which the actuating ring is rotated at least partially toward a coupled position; and
   a selectively engaging push button biased to a default position in which it engages the rod to hold the rod against the spring bias in a retracted position, and operative, upon being manually displaced from the default position, to allow the rod to move to the extended position under the spring bias.

14. The tool changer of claim 13 wherein manually decoupling the first and second units moves the rod to the retracted position.

15. A tool changer, comprising:
   a tool unit operative to attach to a robotic tool and including an annular collar;
   a master unit operative to attach to a robot, and to selectively couple to and decouple from the tool unit;
   a housing in the master unit defining a circular chamber configured to receive the annular collar;
   a plurality of ball members disposed within the housing and operative to move between retracted and extended positions;
   a rotating cam surface ring disposed within the housing in the master unit, the rotating cam surface ring operative to move the ball members between retracted and extended positions as the rotating cam surface ring rotates;
   an actuation mechanism comprising an actuating ring affixed to the rotating cam surface ring and an actuating driver assembly operative to capture and store energy upon decoupling the first and second units, and to use the stored energy to at least partially rotate the actuating ring upon initiating the actuation mechanism; and
   a coupling surface formed on the tool unit annular collar, the coupling surface operative to direct a component of force applied to it by the ball members towards the master unit, as the ball members contact the coupling surface when they are in the extended position.

16. The tool changer of claim 15 wherein the rotating cam surface ring comprises a plurality of recesses, each recesses including:
   a nesting surface operative to contact a ball in a fully retracted position wherein the ball does not extend into the circular chamber; and
   an actuating surface operative to displace a ball towards contact with the coupling surface of the tool unit as the cam member rotates.

17. The tool changer of claim 16 wherein each rotating cam surface ring recess further includes a locking surface operative to press a ball against the coupling surface of the tool unit in an extended position.

18. The tool changer of claim 17 wherein each rotating cam surface ring recess further includes a failsafe surface interposed between the locking surface and the actuating surface, the failsafe surface contacting a ball at a normal angle to the direction of motion of the ball as it moves between retracted and extended positions.

19. The tool changer of claim 17 wherein each rotating cam surface ring recess further includes a failsafe lobe interposed between the locking surface and the actuating surface, the failsafe lobe forming a ball retention channel operative to retain the ball member between the locking surface and the failsafe lobe in the absence of rotational force applied to the cam member.

20. The tool changer of claim 15 wherein the actuating driver assembly comprises:
   a bushing connected to the master unit housing;
   a rod slideably disposed in the bushing and pivotally connected to the actuating ring;
   a spring disposed over the rod, connected to the rod at one end and abutting the bushing at the other end, the spring operative to bias the rod to an extended position in which the actuating ring is rotated at least partially toward a coupled position; and
   a selectively engaging push button biased to a default position in which it engages the rod to hold the rod against the spring bias in a retracted position, and operative, upon being manually displaced from the default position, to allow the rod to move to the extended position under the spring bias.

21. A method of selectively coupling two robotic tool changer units, comprising:
   abutting the two units;
   manually initiating an actuating mechanism in one unit so as to rotate a rotating cam surface ring in one unit partially, but not fully, through its extent of rotation, the rotation of the rotating cam surface ring operative to move a plurality of ball members disposed in one unit toward a coupling surface in the other unit; and
   after the actuating mechanism moves the ball members into contact with the coupling surface, manually moving the rotating cam surface ring further to force the ball members against the coupling surface.

22. The method of claim 21 wherein manually moving the rotating cam surface ring further to force the ball members against the coupling surface comprises manually moving a handle to a fully coupled position, the handle linked to the rotating cam surface ring.

* * * * *